(12) United States Patent
Miyazaki

(10) Patent No.: US 8,124,692 B2
(45) Date of Patent: Feb. 28, 2012

(54) RUBBER COMPOSITION FOR TIRE

(75) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 54 days.

(21) Appl. No.: 12/744,464

(22) PCT Filed: Dec. 4, 2008

(86) PCT No.: PCT/JP2008/072052
§ 371 (c)(1),
(2), (4) Date: May 24, 2010

(87) PCT Pub. No.: WO2009/072560
PCT Pub. Date: Jun. 11, 2009

(65) Prior Publication Data
US 2010/0256258 A1 Oct. 7, 2010

(30) Foreign Application Priority Data

Dec. 5, 2007 (JP) ................................. 2007-314800
Nov. 21, 2008 (JP) ................................. 2008-298297

(51) Int. Cl.
*C08L 9/00* (2006.01)
*C09G 1/00* (2006.01)
(52) U.S. Cl. ........................................ 525/232; 524/77
(58) Field of Classification Search .................. 525/232; 524/77
See application file for complete search history.

(56) References Cited

U.S. PATENT DOCUMENTS

| 6,120,911 A | 9/2000 | Beers et al. | |
| 7,040,369 B2 * | 5/2006 | Hirayama | ..................... 152/543 |
| 2005/0209393 A1 | 9/2005 | Hochi | |

FOREIGN PATENT DOCUMENTS

| EP | 0719827 A1 | 7/1996 |
| JP | 8-176342 A | 7/1996 |
| JP | 8-333483 A | 12/1996 |
| JP | 11-156997 A | 6/1999 |
| JP | 2001-164051 A | 6/2001 |
| JP | 2001-316526 A | 11/2001 |
| JP | 2004-75902 A | 3/2004 |
| JP | 2004-114878 A | 4/2004 |
| JP | 2005-139082 A | 6/2005 |
| JP | 2005-139239 A | 6/2005 |
| JP | 2005-139241 A | 6/2005 |
| JP | 2005-187825 A | 7/2005 |
| JP | 2005-263893 A | 9/2005 |
| JP | 2005-272718 A | 10/2005 |
| JP | 2006-63285 A | 3/2006 |
| JP | 2007-63245 A | 3/2007 |
| JP | 2007-302865 A | 11/2007 |
| JP | 2009-7549 A | 1/2009 |

OTHER PUBLICATIONS

English abstract and full English machine translation of JP-2001-164051-A.
English abstract and full English machine translation of JP-2001-316526-A.
English abstract and full English machine translation of JP-2004-075902-A.
English abstract and full English machine translation of JP-2005-139082-A.
English abstract and full English machine translation of JP-2005-139239-A.

* cited by examiner

*Primary Examiner* — Nathan M Nutter
(74) *Attorney, Agent, or Firm* — Birch, Stewart, Kolasch & Birch, LLP

(57) ABSTRACT

The present invention provides a rubber composition for a tire which has high elongation at break while having high hardness and low tan$\delta$, and in particular, is suitable for bead apexes and base treads. The rubber composition for a tire comprises: 100 parts by weight of a rubber component containing natural rubber and/or isoprene rubber; 2 to 7 parts by weight of sulfur; and 2.1 to 10 parts by weight in total of at least one vulcanization accelerator including 0.6 to 8 parts by weight of an N,N-dialkyl-2-benzothiazolylsulfenamide in which two alkyl groups each are a branch-containing straight chain alkyl group of C4-C16, and each of the alkyl groups may be the same as or different from each other.

9 Claims, No Drawings

RUBBER COMPOSITION FOR TIRE

TECHNICAL FIELD

The present invention relates to a rubber composition for a tire; in particular, a rubber composition that is suitable for bead apexes and base treads.

BACKGROUND ART

As rubber compositions for tires, such as rubber compositions for bead apexes, base treads or the like, there are used compositions containing large amounts of a vulcanizing agent such as sulfur and a vulcanization accelerator, and a small amount of silica (Patent Document 1). Such rubber compositions disadvantageously have a shorter scorch time, and thus are likely to undergo burning upon being processed. In addition, rubbers obtained by curing the rubber compositions tend to have lower elongation at break. In the case that the rubber compositions are used for base treads and bead apexes, the rubber compositions show only an elongation of about 135%.

In these rubber compositions, the amount of natural rubber and/or isoprene rubber is reduced to about 40 parts by weight and these rubbers are used in combination with a polymer such as modified butadiene rubber, modified styrene-butadiene rubber, or chloroprene rubber; thereby these rubber compositions achieve ultra-high hardness or ultra-low tan δ. However, the elongation at break tends to be lower in the case that the rubber compositions contain a small amount of natural rubber and/or isoprene rubber, a large amount of sulfur, and no silica. In addition, such rubber compositions have a shorter scorch time, and thus require a vulcanization retarder.

Patent Document 1: JP-A 2005-187825

SUMMARY OF THE INVENTION

An object of the present invention is to provide a rubber composition for a tire which has high elongation at break while having high hardness and low tan δ, and in particular, is suitable for bead apexes and base treads.

The present invention relates to a rubber composition for a tire, comprising: 100 parts by weight of a rubber component containing natural rubber and/or isoprene rubber; 2 to 7 parts by weight of sulfur; and 2.1 to 10 parts by weight in total of at least one vulcanization accelerator including 0.6 to 8 parts by weight of an N,N-dialkyl-2-benzothiazolylsulfenamide in which two alkyl groups each are a branch-containing straight chain alkyl group of C4-C16, and each of the alkyl groups may be the same as or different from each other.

The rubber component preferably contains 15% by weight or more of the natural rubber and/or isoprene rubber.

The rubber component preferably contains 15% by weight or more and less than 60% by weight of the natural rubber and/or isoprene rubber.

The rubber composition is preferably used for a bead apex or a base tread.

The present invention also relates to a bead apex or a base tread which is produced using the aforementioned rubber composition.

According to the present invention, use of a specific vulcanization accelerator makes it possible to provide a rubber composition for a tire which has high elongation at break while having high hardness and low tan δ, and in particular, is suitable for bead apexes and base treads. The rubber composition for a tire of the present invention can achieve an elongation at break of 250% or higher, while rubber compositions for tires which are formulated in usual manners for bead apexes and base treads, for example, give an elongation at break of only 120 to 150%.

BEST MODE FOR CARRYING OUT THE INVENTION

The rubber composition for a tire of the present invention comprises: 100 parts by weight of a rubber component containing natural rubber and/or isoprene rubber; 2 to 7 parts by weight of sulfur; and 2.1 to 10 parts by weight in total of at least one vulcanization accelerator including 0.6 to 8 parts by weight of an N,N-dialkyl-2-benzothiazolylsulfenamide in which two alkyl groups each are a branch-containing straight chain alkyl group of C4-C16, and each of the alkyl groups may be the same as or different from each other.

Examples of the natural rubber include not only natural rubber itself, but also epoxidized natural rubber (ENR) and deproteinized natural rubber (DPNR). The natural rubber (NR) and/or isoprene rubber (IR) may be used in admixture with other rubbers. Examples of the other rubbers include styrene-butadiene rubber (SBR), styrene-isoprene-butadiene rubber (SIBR), butadiene rubber (BR), isoprene rubber (IR), ethylene-propylene-diene rubber (EPDM), chloroprene rubber (CR), butyl rubber (IIR), and acrylonitrile-butadiene rubber (NBR). In particular, high cis BR, modified BR, and modified SBR are preferable. Examples of the modified BR include polybutadiene rubber (a) (BR (a)) containing a 1,2-syndiotactic polybutadiene crystal, and tin-modified polybutadiene rubber (b) (BR (b)), as disclosed in JP-A 2006-124503 and JP-A 2006-63143.

In the case of admixture with the other rubbers, the rubber component contains the NR and/or IR in an amount of preferably less than 60% by weight, more preferably less than 55% by weight, and most preferably less than 50% by weight. The amount of 60% by weight or more of NR and/or IR tends to cause high tan δ. Also, the rubber component contains the NR and/or IR in an amount of preferably 15% by weight or more, more preferably 20% by weight or more, and most preferably 25% by weight or more. The amount of less than 15% by weight of NR and/or IR tends to cause low tensile strength and poor processability.

In the present invention, an N,N-dialkyl-2-benzothiazolylsulfenamide is used as a vulcanization accelerator. Two alkyl groups of the compound, each of which has a branch-containing straight chain structure, may be the same as or different from each other. Each alkyl group has 4 to 16 carbon atoms, and preferably has 6 to 12 carbon atoms. An alkyl group having 3 or less carbon atoms causes a rapid initial cure rate and poor dispersibility in rubber. An alkyl group having 17 or more carbon atoms causes a too slow initial cure rate and low hardness of rubber. Preferable Examples of the alkyl group include 2-ethylhexyl, 2-methylhexyl, 3-ethylhexyl, 3-methylhexyl, 2-ethylpropyl, 2-ethylbutyl, 2-ethylpentyl, 2-ethylheptyl, and 2-ethyloctyl.

The lower limit of the amount of the N,N-dialkyl-2-benzothiazolylsulfenamide is 0.6 parts by weight or more, and preferably 0.7 parts by weight or more, per 100 parts by weight of the rubber component. An amount of less than 0.6 parts by weight causes low hardness of rubber and low tensile strength. Also, the upper limit of the amount is 8 parts by weight or less, and preferably 7 parts by weight or less. An amount of more than 8 parts by weight causes poor dispersibility, resulting in low tensile strength.

The amount of the sulfur is 2 parts by weight or more, and preferably 3.5 parts by weight or more, per 100 parts by weight of the rubber component. Sulfur in an amount of less than 2 parts by weight causes low hardness (≈E*) of a rubber composition to be obtained. Also, the amount of the sulfur is 7 parts by weight or less, and preferably 6.5 parts by weight or less. Sulfur in an amount of more than 7 parts by weight causes blooming, resulting in a rubber composition having poor adhesion to adjacent components and having an uneven concentration of sulfur.

In the present invention, the N,N-dialkyl-2-benzothiazolylsulfenamide may be used together with other vulcanization accelerators. Examples of the other vulcanization accelerators include vulcanization accelerators represented by the formula: $(C_6H_5—CH_2)_2N—(C=S)—S_y—(C=S)—N(CH_2—C_6H_5)_2$, guanidine vulcanization accelerators, sulfenamide vulcanization accelerators, thiazole vulcanization accelerators, thiuram vulcanization accelerators, thiourea vulcanization accelerators, dithiocarbamate vulcanization accelerators, aldehyde-amine or aldehyde-ammonia vulcanization accelerators, imidazoline vulcanization accelerators, and xanthate vulcanization accelerators.

With respect to the vulcanization accelerators represented by the above formula, y in the formula is an integer of 1 to 8, and is preferably 2. It is difficult to synthesize a compound having y of 9 or more.

Examples of the guanidine vulcanization accelerator include diphenylguanidine, diorthotolylguanidine, triphenylguanidine, orthotolylbiguanide, and diphenylguanidine phthalate.

The sulfenamide vulcanization accelerators are represented by the formula (1).

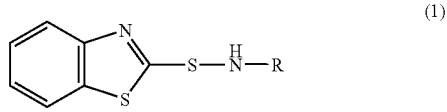

(1)

In the formula (1), R is a group such as a C1-C18 linear alkyl group, branched alkyl group, or cycloalkyl group. In particular, R is preferably a branched alkyl group.

Specific examples of the sulfenamide vulcanization accelerator include N-tert-butyl-2-benzothiazolylsulfenamide (TBBS), N-cyclohexyl-2-benzothiazolylsulfenamide (CBS), N,N-dicyclohexyl-2-benzothiazolylsulfenamide (DCBS), and N,N-diisopropyl-2-benzothiazole sulfenamide. In particular, TBBS and CBS are preferable as the sulfenamide vulcanization accelerator because they are well dispersed in rubber and provide stable vulcanization physical properties.

Examples of the thiazole vulcanization accelerator include MBT (2-mercaptobenzothiazole), MBTS (dibenzothiazyl disulfide), a sodium salt, zinc salt, copper salt, and cyclohexylamine salt of 2-mercaptobenzothiazole, 2-(2,4-dinitrophenyl)mercaptobenzothiazole, and 2-(2,6-diethyl-4-morpholinothio)benzothiazole. Among these, preferable as the thiazole vulcanization accelerator are MBT and MBTS, and particularly preferable is MBTS.

Examples of the thiuram vulcanization accelerator include TMTD (tetramethylthiuram disulfide), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide, and pentamethylenethiuram tetrasulfide.

Examples of the thiourea vulcanization accelerator include thiourea compounds such as thiocarbamide, diethylthiourea, dibutylthiourea, trimethylthiourea, and diorthotolylthiourea.

Examples of the dithiocarbamate vulcanization accelerator include dithiocarbamate compounds such as zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, a complex salt of zinc pentamethylenedithiocarbamate and piperidine, zinc hexadecyl(or octadecyl)isopropyldithiocarbamate, zinc dibenzyldithiocarbamate, sodium diethyldithiocarbamate, piperidine pentamethylenedithiocarbamate, selenium dimethyldithiocarbamate, tellurium diethyldithiocarbamate, and cadmium diamyldithiocarbamate.

Examples of the aldehyde-amine or aldehyde-ammonia vulcanization accelerator include acetaldehyde-aniline reaction products, butylaldehyde-aniline condensation products, hexamethylenetetramine (HMT), and acetaldehyde-ammonia reaction products.

The total amount of the vulcanization accelerators, including the N,N-dialkyl-2-benzothiazolylsulfenamide, to be added in the rubber composition is 2.1 to 10 parts by weight per 100 parts by weight of the rubber component. The lower limit of the total amount of the vulcanization accelerators is preferably 2.2 parts by weight, and more preferably 2.4 parts by weight. A total amount of less than 2.1 parts by weight tends to cause low hardness and deterioration in tan δ. Also, the upper limit of the total amount is preferably 9.5 parts by weight, and more preferably 9 parts by weight. A total amount of more than 10 parts by weight tends to cause poor dispersibility and low tensile strength.

The rubber composition of the present invention may contain, if necessary, fillers such as carbon black, silica, and calcium carbonate, and additives such as plasticizers, zinc oxide, vulcanization assistants, foaming agents, anti-oxidants, and waxes, in addition to the rubber component, the sulfur, and the vulcanization accelerators. Regarding silica, silica is acidic, retards vulcanization, is well dispersed, and improves the elongation at break. However, a rubber composition shrinks and shows poor dimension stability if left standing before rubber vulcanization; in the case that it is used for a bead apex, the bead apex tends to be curled at the edges. In addition, silica in an amount of 15 parts by weight or more does not provide low tan δ.

In the case that the rubber composition is used for a bead apex, the lower limit of the amount of carbon black is preferably 45 parts by weight or more, and more preferably 50 parts by weight or more, per 100 parts by weight of the rubber component. An amount of less than 45 parts by weight tends to cause low hardness and poor handling response. Also, the upper limit of the amount is preferably 80 parts by weight or less, and more preferably 75 parts by weight or less. An amount of more than 80 parts by weight tends to cause poor dispersibility of carbon black in polymers and low tensile strength.

In the case that the rubber composition is used for a base tread, on the other hand, the lower limit of the amount of carbon black is preferably 15 parts by weight or more, and more preferably 20 parts by weight or more, per 100 parts by weight of the rubber component. An amount of less than 15 parts by weight tends to cause low tensile strength and hardness. Also, the upper limit of the amount is preferably 50 parts by weight or less, and more preferably 45 parts by weight or less. An amount of more than 50 parts by weight tends to cause deterioration in heat build-up property.

The bead apex and the base tread of the present invention are produced from the rubber composition of the present invention. Here, a tire having the bead apex of the present invention comprises a tread portion, a pair of side-wall portions extending on both sides of the tread portion, a pair of bead portions formed on the side-wall portions, and a carcass with both edge parts folded back around bead cores of the bead portions. The bead apex refers to a tire component disposed between the folded-back part and the main part of the carcass and extending in the side-wall direction of the tire.

The tire is produced by a common method. For example, the rubber component, a reinforcing filler, and, if necessary, additives are mixed and kneaded; the mixture is extruded and processed into a shape of a bead apex or a base tread of a tire before vulcanization, and then molded on a tire building machine by a common method to produce an unvulcanized tire. This unvulcanized tire is heated and pressurized in a vulcanizer, whereby the tire can be produced.

EXAMPLES

The present invention is more specifically described hereinbelow referring to, but not limited to, examples.
(Materials)
NR: TSR20
VCR617: VCR617 (SPB content: 17% by weight, SPB melting point: 200° C.), produced by Ube Industries, Ltd.
Modified BR: Nipol BR1250H (polymerized by the use of lithium as an initiator), produced by ZEON Corp.
Carbon black: Carbon black N550, produced by Showa Cabot K.K.
Modified phenol resin: PR12686 (cashew oil-modified resin), produced by Sumitomo Bakelite Co., Ltd.
Anti-oxidant: NOCRAC 6C, produced by Ouchi Shinko Chemical Industrial Co., Ltd.
Zinc oxide: Ginrei R, produced by Toho Zinc Co., Ltd.
Stearic acid: produced by NOF Corp.
Oil-treated insoluble sulfur: CRYSTEX HSOT20 (insoluble sulfur containing 80% by weight of sulfur component and 20% by weight of oil component, sulfur component containing 90% or more of insoluble sulfur and 10% or less of soluble sulfur), produced by Flexsys
Vulcanization accelerator DCBS: Accel DZ-G (N,N-dicyclohexylbenzothiazolylsulfenamide), produced by Kawaguchi Chemical Industry Co., Ltd.
Vulcanization accelerator BEHZ: BEHZ (N,N-di(2-ethylhexyl)-2-benzothiazolylsulfenamide), produced by Kawaguchi Chemical Industry Co., Ltd.
Vulcanization accelerator TBBS: NOCCELER NS, produced by Ouchi Shinko Chemical Industrial Co., Ltd.
Vulcanization accelerator HMT: NOCCELER H (hexamethylenetetramine (HMT)), produced by Ouchi Shinko Chemical Industrial Co., Ltd.
N-cyclohexylthiophthalamide: CTP, produced by Ouchi Shinko Chemical Industrial Co., Ltd.

Auxiliary vulcanization accelerator: TACKIROL V200 (condensation product of alkylphenol and sulfur chloride), produced by Taoka Chemical Co., Ltd.

Examples 1 to 5 and Comparative Examples 1 to 5 (Bead Apex)

According to the respective formulations shown in Table 1, chemical agents except oil-treated insoluble sulfur, vulcanization accelerators and CTP were mixed and kneaded with a Banbury mixer. The oil-treated insoluble sulfur, the vulcanization accelerators, and the CTP were added to the obtained mixture, and then kneaded with an open roll mill to provide an unvulcanized rubber composition. The unvulcanized rubber composition was press-vulcanized for 12 minutes at 170° C. Thus, each vulcanized rubber sample was produced.

Examples 1 to 5 and Comparative Examples 1 to 5 (Base Tread)

According to the respective formulations shown in Table 2, chemical agents except oil-treated insoluble sulfur, vulcanization accelerators, and CTP were mixed and kneaded with a Banbury mixer. The oil-treated insoluble sulfur, the vulcanization accelerators, and the CTP were added to the obtained mixture, and then kneaded with an open roll mill to provide an unvulcanized rubber composition. The unvulcanized rubber composition was press-vulcanized for 12 minutes at 170° C. Thus, each vulcanized rubber sample was produced.
(Test methods)
<Vulcanization Test>

The vulcanization test was performed at a measurement temperature of 160° C. with an oscillating curemeter (curelastometer) described in JIS K6300, thereby giving a cure rate curve on which times vs. torques were plotted. The time period $T_{10}$ (min.) required for reaching a torque of ML+0.1ME was determined. Here, ML refers to the minimum torque of the cure rate curve, MH refers to the maximum torque, and ME refers to the difference (MH-ML).
<Viscoelasticity Test>

A sample having a predetermined size was prepared from the vulcanized rubber composition. The complex modulus of elasticity (E*) and the loss tangent (tan δ) of the rubber sample at 70° C. were measured with a viscoelastic spectrometer VES (Iwamoto Seisakusho Co., Ltd.) under conditions of: an initial strain of 10%, a dynamic strain of 2%, and a frequency of 10 Hz. A larger E* indicates a better rigidity, and a smaller tan δ indicates a lower hysteresis loss and lower heat build-up.
<Tensile Test (Tensile Strength and Elongation at Break)>

The tensile test was performed on a No. 3 dumbbell-shaped sample in accordance with JIS K6251, and thus the elongation at break EB (%) at room temperature was determined.

Tables 1 and 2 show the test results.

TABLE 1

| | Bead apex | | | | | | | | | |
|---|---|---|---|---|---|---|---|---|---|---|
| | Examples | | | | | Comparative Examples | | | | |
| | 1 | 2 | 3 | 4 | 5 | 1 | 2 | 3 | 4 | 5 |
| NR | 40 | 40 | 40 | 40 | 40 | 40 | 40 | 40 | 40 | 40 |
| VCR617 | 60 | 60 | 60 | 60 | 60 | 60 | 60 | 60 | 60 | 60 |
| Carbon black N550 | 55 | 55 | 55 | 55 | 55 | 55 | 55 | 55 | 55 | 55 |
| Modified phenol resin | 18 | 18 | 18 | 18 | 18 | 18 | 18 | 18 | 18 | 18 |
| Anti-oxidant | 1.5 | 1.5 | 1.5 | 1.5 | 1.5 | 1.5 | 1.5 | 1.5 | 1.5 | 1.5 |
| Zinc oxide | 7 | 7 | 7 | 7 | 7 | 7 | 7 | 7 | 7 | 7 |

TABLE 1-continued

Bead apex

|  | Examples | | | | | Comparative Examples | | | | |
| --- | --- | --- | --- | --- | --- | --- | --- | --- | --- | --- |
|  | 1 | 2 | 3 | 4 | 5 | 1 | 2 | 3 | 4 | 5 |
| Stearic acid | 3 | 3 | 3 | 3 | 3 | 3 | 3 | 3 | 3 | 3 |
| Insoluble sulfur | 7.5 | 7.5 | 7.5 | 7.5 | 6.25 | 7.5 | 7.5 | 9.0 | 6.25 | 7.5 |
| DCBS | — | 1.8 | — | — | — | 3.7 | 3.2 | — | — | — |
| BEHZ | 4.3 | 2.2 | 6.45 | 3.4 | 4.3 | — | 0.5 | 4.3 | 9.0 | 1.0 |
| HMT | 1.8 | 1.8 | 1.8 | 1.8 | 1.8 | 1.8 | 1.8 | 1.8 | 1.8 | 1.0 |
| Total amount of vulcanization accelerators | 6.1 | 5.8 | 8.25 | 5.2 | 6.1 | 5.5 | 5.5 | 6.1 | 10.8 | 2.0 |
| CTP | 0.6 | 0.6 | 0.6 | 0.6 | 0.6 | 0.6 | 0.6 | 0.6 | 0.6 | 0.6 |
| Auxiliary vulcanization accelerator | 1.5 | 1.5 | 0.5 | 1.5 | 2.5 | 1.5 | 1.5 | 1.5 | 1.5 | 4 |
| T10 (min.) | 2.3 | 1.8 | 2.2 | 2.6 | 2.5 | 1.5 | 1.7 | 2.1 | 1.6 | 2.8 |
| E* (Pa) | 45 | 45 | 51 | 41 | 43 | 44 | 43 | 53 | 54 | 37 |
| tan δ | 0.105 | 0.106 | 0.100 | 0.115 | 0.098 | 0.109 | 0.110 | 0.098 | 0.097 | 0.123 |
| EB (%) | 200 | 150 | 160 | 250 | 175 | 120 | 130 | 130 | 80 | 160 |

TABLE 2

Base tread

|  | Examples | | | | | Comparative Examples | | | | |
| --- | --- | --- | --- | --- | --- | --- | --- | --- | --- | --- |
|  | 1 | 2 | 3 | 4 | 5 | 1 | 2 | 3 | 4 | 5 |
| NR | 45 | 45 | 45 | 45 | 45 | 45 | 45 | 45 | 45 | 45 |
| Modified BR (BR1250H) | 40 | 40 | 40 | 40 | 40 | 40 | 40 | 40 | 40 | 40 |
| VCR617 | 15 | 15 | 15 | 15 | 15 | 15 | 15 | 15 | 15 | 15 |
| Carbon black N550 | 25 | 25 | 25 | 25 | 25 | 25 | 25 | 25 | 25 | 25 |
| Anti-oxidant | 2 | 2 | 2 | 2 | 2 | 2 | 2 | 2 | 2 | 2 |
| Zinc oxide | 7 | 7 | 7 | 7 | 7 | 7 | 7 | 7 | 7 | 7 |
| Stearic acid | 3 | 3 | 3 | 3 | 3 | 3 | 3 | 3 | 3 | 3 |
| Insoluble sulfur | 7 | 7 | 5 | 7 | 3 | 7 | 7 | 9 | 4 | 2.4 |
| DCBS | — | 1.1 | — | — | — | 2.3 | 1.9 | — | — | — |
| BEHZ | 2.7 | 1.4 | 4.0 | 1.9 | 4.0 | — | 0.5 | 2.7 | 9.0 | 4.0 |
| TBBS | 0.2 | — | — | 0.2 | — | 0.2 | — | 0.2 | — | — |
| Total amount of vulcanization accelerators | 2.9 | 2.5 | 4.0 | 2.1 | 4.0 | 2.5 | 2.4 | 2.9 | 9.0 | 4.0 |
| Auxiliary vulcanization accelerator | 1.5 | 1.5 | 1.5 | 1.5 | 4.0 | 1.5 | 1.5. | 1.5 | 1.5 | 6.0 |
| T10 (min.) | 3.5 | 2.7 | 3.3 | 3.9 | 3.3 | 2.5 | 3.0 | 3.2 | 2.4 | 3.8 |
| E* (Pa) | 4.0 | 4.1 | 4.9 | 3.5 | 4.4 | 4.1 | 4.0 | 4.9 | 4.8 | 3.3 |
| tan δ | 0.072 | 0.073 | 0.078 | 0.081 | 0.068 | 0.073 | 0.072 | 0.065 | 0.062 | 0.081 |
| EB (%) | 220 | 170 | 280 | 270 | 260 | 120 | 130 | 90 | 80 | 200 |

Evaluation results in Tables 1 and 2 show that use of the vulcanization accelerator BEHZ caused a higher elongation at break and further a higher index of drum durability, even in the case that the rubber composition contained large amounts of a vulcanizing agent such as sulfur and vulcanization accelerators and a small amount of silica.

The invention claimed is:

1. A rubber composition for a tire, comprising:
   100 parts by weight of a rubber component containing natural rubber and/or isoprene rubber and further containing at least one selected from the group consisting of high cis butadiene rubber, polybutadiene rubber containing a 1,2-syndiotactic polybutadiene crystal, and tin-modified polybutadiene rubber;
   2 to 7 parts by weight of sulfur; and
   2.1 to 10 parts by weight in total of at least one vulcanization accelerator including 0.6 to 8 parts by weight of an N,N-dialkyl-2-benzothiazolylsulfenamide in which two alkyl groups each are a branch-containing straight chain alkyl group of C4-C16, and each of the alkyl groups may be the same as or different from each other,
   wherein the rubber component contains 15% by weight or more and less than 60% by weight of the natural rubber and/or isoprene rubber.

2. The rubber composition for a tire according to claim 1, wherein the rubber composition is used for a bead apex or a base tread.

3. A bead apex produced using the rubber composition of claim 2.

4. A base tread produced using the rubber composition of claim 2

5. The rubber composition for a tire according to claim 1, wherein the two alkyl groups each are a branch-containing straight chain alkyl group of C6-C12.

6. The rubber composition for a tire according to claim 1, wherein the two alkyl groups each are 2-ethylhexyl, 2-methylhexyl, 3-ethylhexyl, 3-methylhexyl, 2-ethylpropyl, 2-ethylbutyl, 2-ethylpentyl, 2-ethylheptyl, or 2-ethyloctyl.

7. The rubber composition for a tire according to claim 1, further comprising at least one member selected from the group consisting of vulcanization accelerators represented by the formula: $(C_6H_5-CH_2)_2N-(C=S)-S_y-(C=S)-N(CH_2-C_6H_5)_2$, guanidine vulcanization accelerators, sulfenamide vulcanization accelerators, thiazole vulcanization accelerators, thiuram vulcanization accelerators, thiourea vulcanization accelerators, dithiocarbamate vulcanization accelerators, aldehyde-amine or aldehyde-ammonia vulcanization accelerators, imidazoline vulcanization accelerators, and xanthate vulcanization accelerators.

8. The bead apex according to claim 3, wherein the rubber composition further comprises 45 to 80 parts of carbon black by weight per 100 parts by weight of the rubber component.

9. The base tread according to claim 4, wherein the rubber composition further comprises 15 to 50 parts of carbon black by weight per 100 parts by weight of the rubber component.

* * * * *